US009458309B2

(12) United States Patent
Imamura et al.

(10) Patent No.: US 9,458,309 B2
(45) Date of Patent: Oct. 4, 2016

(54) MOLDING MATERIAL AND LIQUID EJECTION FLOW PATH MEMBER USING THE SAME

(71) Applicant: CANON KABUSHIKI KAISHA, Tokyo (JP)

(72) Inventors: Isao Imamura, Kawasaki (JP); Yoshiyuki Shino, Yokohama (JP); Shogo Kawamura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/674,243

(22) Filed: Mar. 31, 2015

(65) Prior Publication Data

US 2015/0307689 A1    Oct. 29, 2015

(30) Foreign Application Priority Data

Apr. 23, 2014 (JP) ................. 2014-088978

(51) Int. Cl.
| | |
|---|---|
| C08K 5/521 | (2006.01) |
| C08K 3/36 | (2006.01) |
| C08K 3/22 | (2006.01) |
| C08K 5/21 | (2006.01) |
| B41J 2/14 | (2006.01) |
| C08K 5/5435 | (2006.01) |

(52) U.S. Cl.
CPC ............. *C08K 5/521* (2013.01); *C08K 3/22* (2013.01); *C08K 3/36* (2013.01); *C08K 5/21* (2013.01); *B41J 2/14145* (2013.01); *B41J 2002/14306* (2013.01); *C08K 5/5435* (2013.01); *C08K 2003/2227* (2013.01)

(58) Field of Classification Search
CPC ........ B41J 3/4073; B41J 2/01; B41J 2/0057; B41J 2002/14306; B41J 2/14145; B29C 67/0092; B29C 7/0059; C08K 5/521; C08K 5/5435; C08K 3/36; C08K 5/21; C08K 3/22; C08K 2003/2227
USPC ............................................... 347/20
See application file for complete search history.

(56) References Cited

U.S. PATENT DOCUMENTS

| | | | | |
|---|---|---|---|---|
| 4,417,010 A * | 11/1983 | Shimp | ................. | C08G 59/686 252/182.24 |
| 5,057,854 A | 10/1991 | Pond et al. | | |
| 5,312,576 A * | 5/1994 | Swei | ....................... | B29C 41/28 264/112 |
| 5,915,763 A * | 6/1999 | Masuda | ..................... | 29/890.1 |
| 2002/0040094 A1* | 4/2002 | Takahashi | ............. | C08F 283/06 524/590 |
| 2006/0272150 A1* | 12/2006 | Eguchi | ................... | H05K 3/284 29/841 |
| 2010/0130655 A1* | 5/2010 | Agarwal | ............. | C08G 59/182 524/145 |
| 2012/0021233 A1* | 1/2012 | Hayakawa | ............. | H01L 24/27 428/447 |
| 2012/0097194 A1* | 4/2012 | McDaniel | ............. | A01N 63/02 134/26 |
| 2013/0088542 A1* | 4/2013 | Hisanaga | ................. | B41J 2/16 347/20 |

FOREIGN PATENT DOCUMENTS

| | | |
|---|---|---|
| JP | 5-24192 A | 2/1993 |
| JP | 2009-155370 A | 7/2009 |
| JP | 2011-173970 A | 9/2011 |

* cited by examiner

*Primary Examiner* — Manish S Shah
*Assistant Examiner* — Yaovi M Ameh
(74) *Attorney, Agent, or Firm* — Fitzpatrick, Cella, Harper & Scinto

(57) ABSTRACT

The invention provides a molding material including a liquid epoxy resin composition containing an epoxy resin, a curing agent or a curing catalyst, a filler, a thixotropy-imparting agent, and a wetting dispersant.

18 Claims, 1 Drawing Sheet

MOLDING MATERIAL AND LIQUID EJECTION FLOW PATH MEMBER USING THE SAME

BACKGROUND OF THE INVENTION

1. Field of the Invention

The present invention relates to a molding material and a liquid ejection flow path member using the same.

2. Description of the Related Art

An ink jet recording apparatus involves relatively low running costs, is capable of being miniaturized, and can easily be adapted to color image recording with a plurality of inks, and so it is widely used in, for example, computer-related output equipment as a commercial product.

In recent years, there has been a demand for developing an ink jet recording head having a longer recording width so as to make it possible to record a high-definition image at higher speed. Specifically, an ink jet recording head having a recording width of from 4 inches (10.2 cm) to 12 inches (30.5 cm) in length is required. As a method for realizing an ink jet recording head having a long recording width, for example, Japanese Patent Application Laid-Open No. H05-24192 proposes a method of arranging a plurality of recording element substrates each having a moderate length on a support member to realize an ink jet recording head having a long recoding width as a whole.

In the method described in Japanese Patent Application Laid-Open No. H05-24192, the support member is required to have a high flatness and a low coefficient of linear expansion to cause no stress to a substrate such as Si. In addition, the support member is required to have high ink resistance. The reason for this is that if a material of the support member is dissolved in an ink, ejection performance is lowered, and deposit may occur in some cases to block an ejection orifice. An example of a representative material having these properties includes alumina. However, it is expensive to form a large-sized part with alumina. On the other hand, if a resin molding material disclosed in Japanese Patent Application Laid-Open No. 2011-173970 or No. 2009-155370 is used to cheaply produce the support member, the coefficient of linear expansion and ink resistance thereof are not always sufficient.

In addition, if an epoxy resin is used as a material of the support member in view of chemical resistance, it is necessary to increase the addition amount of filler for achieving a coefficient of linear expansion comparable with alumina. However, if the addition amount of the filler is increased, a mixture thereof becomes finely granular or powdery such as powder, and so it is impossible to uniformly mix the epoxy resin with the filler. On the other hand, even if the amount of the filler to be added is reduced to uniformly mix such materials, the epoxy resin expands upon extrusion under heating upon transfer molding, and the viscosity of the epoxy resin is lowered, and so surface roughening in which the epoxy resin is separated from the filler occurs, and surface accuracy cannot be ensured.

SUMMARY OF THE INVENTION

It is an object of the present invention to provide a molding material in which an epoxy resin is uniformly mixed with a filler even when the addition amount of the filler is increased and with which the epoxy resin is not separated from the filler upon molding.

In order to achieve the above object, the present invention provides a molding material comprising a liquid epoxy resin composition containing an epoxy resin, a curing agent or a curing catalyst, a filler, a thixotropy-imparting agent, and a wetting dispersant.

The present invention also provides a liquid ejection flow path member comprising a cured product of the molding material according to the present invention.

Further features of the present invention will become apparent from the following description of exemplary embodiments with reference to the attached drawings.

BRIEF DESCRIPTION OF THE DRAWINGS

FIGS. 1A and 1B illustrate an example of a liquid ejection head provided with a support member containing a cured product of the molding material according to the present invention, in which FIG. 1A illustrates a side elevational view and a bottom view, and FIG. 1B illustrates an exploded perspective view.

DESCRIPTION OF THE EMBODIMENTS

Figure 1A:
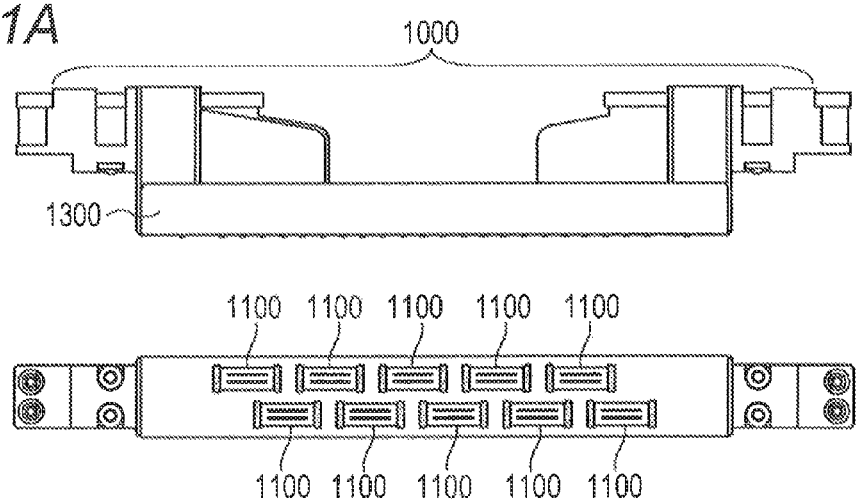

Preferred embodiments of the present invention will now be described in detail in accordance with the accompanying drawings.

The molding material according to the present invention contains a liquid epoxy resin composition containing an epoxy resin, a curing agent or a curing catalyst, a filler, a thixotropy-imparting agent, and a wetting dispersant. In the molding material according to the present invention, the liquid epoxy resin composition is used as a resin component, and the wetting dispersant is added, whereby the resulting mixture becomes clayish even when the composition is highly filled with the filler, and so the epoxy resin is uniformly mixed with the filler. In addition, the thixotropy-imparting agent is added, whereby separation of the resin component from the filler upon molding can be inhibited. The molding material according to the present invention can be favorably used as a material of a support member for supporting a recording element substrate in a full-line type recording head of, in particular, a liquid ejection system which will be described subsequently.

Liquid Epoxy Resin Composition

The liquid epoxy resin composition contains an epoxy resin, a curing agent or a curing catalyst and has such a feature that it is liquid at ordinary temperature (15 to 35° C.) The liquid epoxy resin composition may contain a curing accelerator and a silane coupling agent as needed in addition to the epoxy resin and the curing agent or the curing catalyst. For example, the liquid epoxy resin composition may be composed of the epoxy resin, the curing agent and the silane coupling agent. The respective components may be solid so far as the prepared epoxy resin composition is liquid. A flowable liquid epoxy resin composition is used as the epoxy resin composition, whereby the composition can be highly filled with the filler, and the filler can be sufficiently covered with the resin component. In addition, the liquid epoxy resin composition is used, whereby the epoxy resin is uniformly mixed with the curing agent or the curing catalyst at a molecular level unlike a molding material prepared by mixing a solid material to make the resulting mixture bulky with a pelletizing agent such as wax. Therefore, the molding material according to the present invention shows no ununiformity of the components, and a cured product thereof has excellent chemical resistance. The content of the liquid epoxy resin composition in the molding material is favorably 30% by volume or less, more favorably 25% by volume or less. In addition, the content is favorably 1% by volume or more, more favorably 5% by volume or more.

Examples of the epoxy resin include bisphenol A type epoxy resins, bisphenol F type epoxy resins, bisphenol AD type epoxy resins, compounds obtained by adding an alkylene oxide to these epoxy resins, epoxy novolak resins, glycidyl ether type epoxy resins such as bisphenol A novolak diglycidyl ether, bisphenol F novolak diglycidyl ether, and alicyclic epoxy resins. A solid epoxy resin may also be used in addition to the liquid epoxy resin so far as the prepared epoxy resin composition is liquid. Examples of the solid epoxy resin include epoxy resins having a biphenyl skeleton, a naphthalene skeleton, a cresol novolak skeleton, trisphenol methane skeleton, dicyclopentadiene skeleton and a phenol biphenylene skeleton. Among these, an epoxy resin having a dicyclopentadiene skeleton is favorably used from the viewpoint of dimensional change due to moisture absorption or water absorption. These epoxy resins may be used either singly or in any combination thereof. The content of the epoxy resin in the liquid epoxy resin composition is favorably 30% by mass or more and 95% by mass or less, more favorably 40% by mass or more and 95% by mass or less.

For example, an amine, a polyamide, an acid anhydride, imidazole or phenol may be used as the curing agent. In addition, a compound obtained by adding an epoxy resin to the above-mentioned compound to improve the pot life and reactivity thereof may also be used. Further, a low viscosity compound having latency is favorable as the curing agent. Examples of the curing agent include acid anhydrides such as tetrahydrophthalic anhydride, methyltetrahydrophthalic anhydride, hexahydrophthalic anhydride, methylhexahydrophthalic anhydride, methylnadic anhydride, hydrogenated methylnadic anhydride and trialkyltetrahydrophthalic anhydride; and imidazoles such as 2-ethyl-4-methylimidazole and 1-(2-cyanoethyl)-2-ethyl-4-methylimidazole. In addition, a solid curing agent may also be used as the curing agent in addition to the liquid curing agent so far as the resulting epoxy resin composition is liquid. Examples of the solid curing agent include phenolic curing agents such as xylylene novolak, biphenyl novolak and dicyclopentadiene phenol novolak. Among these, trialkyltetrahydrophthalic anhydride is favorably used as the curing agent from the viewpoint of dimensional change due to moisture absorption or water absorption. In addition, a liquid imidazole is favorably used as the curing agent from the viewpoints of latency and reactivity. Incidentally, the liquid imidazole means an imidazole that is liquid at ordinary temperature (15 to 35° C.). Examples of the liquid imidazole include 1,2-dimethylimidazole, 2-ethyl-4-methylimidazole and 1-benzyl-2-methylimidazole. These curing agents may be used either singly or in any combination thereof.

Examples of the curing catalyst include tertiary amines, boron trifluoride-amine complexes and cationic polymerization catalysts. These curing catalysts may be used either singly or in any combination thereof.

Examples of the curing accelerator include imidazole, tetraethylammonium bromide, tetraphenyl-phosphonium bromide, 1,8-diaza-bicyclo-(5,4,0)-undecene-7 and 2-ethylhexanoic acid salts. These curing accelerators may be used either singly or in any combination thereof.

The liquid epoxy resin composition favorably contains a silane coupling agent from the viewpoint of adhesion to the filler. Examples of the silane coupling agent include γ-glycidoxypropyltrimethoxysilane, β-(3,4-epoxycyclohexyl)ethyltrimethoxysilane, γ-mercaptopropyl-triethoxysilane and γ-aminopropyltrimethoxysilane. These silane coupling agents may be used either singly or in any combination thereof. The content of the silane coupling agent in the liquid epoxy resin composition is favorably 1% by volume or more and 10% by volume or less, more favorably 2% by volume or more and 6% by volume or less. Incidentally, since the specific gravity of the silane coupling agent is about 1, the content of the silane coupling agent in the liquid epoxy resin composition is favorably 1% by mass or more and 10% by mass or less, more favorably 2% by mass or more and 6% by mass or less. In addition, a titanate-based or aluminate-based coupling agent may also be used.

Filler

Examples of the filler include glass, titanium oxide, alumina, aluminum hydroxide, magnesium hydroxide, talc, mica and silica. Among these, fused silica with low coefficient of linear expansion is favorable as the filler. The shape of the filler is favorably spherical from the viewpoint of increasing a filling rate. In addition, a filler different in particle size is favorably contained from such a viewpoint that closest filling can be conducted. For example, when two fillers different in particle size are contained, the ratio between the fillers different in particle size in these fillers is favorably 9:1 to 6:4 in terms of the volume ratio of a large particle size filler to a small particle size filler. In addition, plural kinds of fillers may also be mixed and used according to requested properties. For example, when the molding material according to the present invention is used in a container for a strong alkaline solution, alumina having high chemical resistance is used in combination as a filler, good chemical resistance is achieved.

The content of the filler in the molding material is favorably 70% by volume or more, more favorably 79% by volume or more from such a viewpoint that the effect of the present invention can be more successfully developed though it may vary according to the kind of the filler and the viscosity of the epoxy resin. For example, when fused quartz is used as the filler, the content thereof is favorably 79% by volume or more.

Thixotropy-Imparting Agent

Examples of the thixotropy-imparting agent include inorganic fine materials such as fused silica and modified urethanes. The thixotropy-imparting agent is favorably liquid at ordinary temperature (15 to 35° C.) from such a viewpoint that the thixotropy can be imparted without increasing the viscosity so much. Examples of the liquid thixotropy-imparting agent include modified urethanes. In particular, a compound having a modified urethane skeleton is good in compatibility with epoxy, and so a cured product thereof is less elutable in a liquid such as an ink. Among the modified urethanes, urea-urethane is favorable. These thixotropy-imparting agents may be used either singly or in any combination thereof.

The content of the thixotropy-imparting agent in the molding material is favorably 0.01% by volume or more and 0.5% by volume or less, more favorably 0.04% by volume or more and 0.2% by volume or less though it may vary according to the kinds of the filler and the epoxy resin. The thixotropy-imparting agent is contained in a proportion of 0.01% by volume or more to the filler, whereby a sufficient effect can be achieved. In addition, the thixotropy-imparting agent is contained in a proportion of 0.2% by volume or less to the filler, whereby the lowering of flowability due to increase of viscosity when the thixotropy-imparting agent is an inorganic fine material can be inhibited. In addition, when the thixotropy-imparting agent is a liquid thixotropy-imparting agent which does not participate in reaction, elution and/or separation of the thixotropy-imparting agent after cured can be inhibited.

Wetting Dispersant

A phosphate ester salt or an alkylammonium salt is favorable as the wetting dispersant. Examples of commercially available products thereof include DISPERBYK-142, DISPERBYK-145, DISPERBYK-164 and BYK-9076 (all, trade names, products of BYK-Chemie GmbH), and DISPARLON 1860 (trade name, product of Kusumoto Chemicals, Ltd.). These wetting dispersants may be used either singly or in any combination thereof.

The content of the wetting dispersant in the molding material is favorably 0.01% by volume or more and 0.5% by volume or less, more favorably 0.04% by volume or more and 0.2% by volume or less though it may vary according to the kinds of the filler and the epoxy resin. The wetting dispersant is contained in a proportion of 0.01% by volume or more to the filler, whereby a sufficient effect is achieved. In addition, the wetting dispersant is contained in a proportion of 0.5% by volume or less to the filler, whereby the wetting dispersant does not participate in reaction, and elution and/or separation of the wetting dispersant after cured can be prevented.

The molding material according to the present invention may suitably contain a diluent or another additive in addition to the above-described components.

Figure 1B:
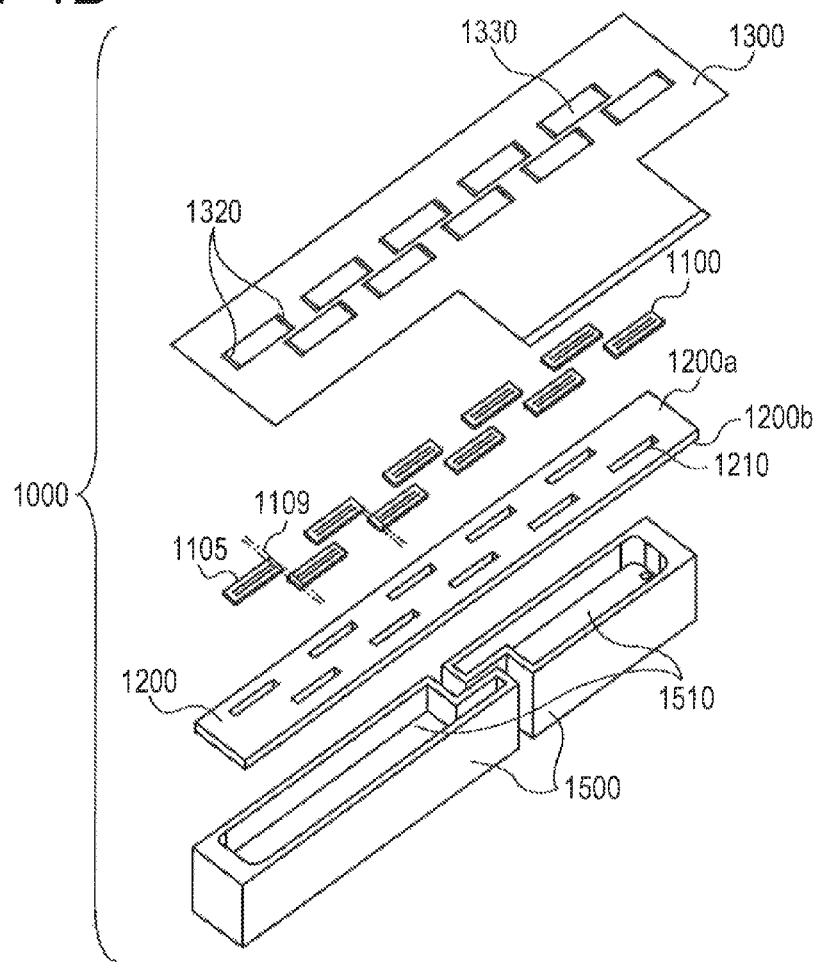

Since the molding material according to the present invention has a low coefficient of linear expansion, is excellent in moldability and is less elutable in a liquid such as an ink, it is suitably used as a support member 1200 of such a liquid ejection head having a wide recording width as illustrated in, for example, FIG. 1B. FIG. 1A illustrates a side elevational view and a bottom view of the liquid ejection head 1000, and FIG. 1B is an exploded perspective view illustrating parts constructing the liquid ejection head 1000 illustrated in FIG. 1A. In the liquid ejection head 1000, an ejection orifice array is formed over a range capable of covering the overall width of a sheet which may be used, and so the liquid ejection head is a full-line type recording head of a liquid ejection system capable of conducting large-width recording without scanning the liquid ejection head 1000.

The liquid ejection head 1000 has a recording element substrate 1100 formed of Si and a liquid supply slit 1210, a support member 1200 for supporting the recording element substrate, an electric wiring board 1300 for electrically connecting the recording element substrate to a recording apparatus and a liquid storage portion 1510 and is provided with a liquid supply member 1500 joined to the support member 1200. A plurality of the recording element substrates 1100 each have an ejection orifice 1105 and are arranged on a principal plane 1200a of the support member 1200 with a high precision in a direction (Y-direction) intersecting a direction of conveying a recording medium (X-direction). In FIG. 1B, the plurality of the recording element substrates 1100 are alternately arranged in two rows in such a manner that the end portions 1109 of the ejection orifice arrays overlap with each other. The liquid supply member 1500 is arranged on a plane 1200b opposing the principal plane 1200a. The electric wiring board 1300 is provided with an electrode terminal 1320 and an opening 1330.

The support member 1200 is required to have high resistance to a liquid such as an ink because it forms a part of a flow path. For example, when a material of the support member is dissolved in the liquid such as the ink even in an amount of several ppm levels, the liquid such as the ink evaporates in the vicinity of the ejection orifice, and deposits adhere to the vicinity of the ejection orifice. Therefore, dot misalignment of ejected droplets may occur in some cases to cause defective printing. In addition, since the support member 1200 is bonded to the recording element substrate 1100 formed of Si with, for example, an adhesive, it is favorable that the coefficient of linear expansion of the support member 1200 is lower, and so the support member is required to have high dimensional accuracy. Since the molding member according to the present invention has a low coefficient of linear expansion, is excellent in moldability and is little dissolved in the liquid such as the ink, a cured product of the molding material according to the present invention is favorably used as a liquid ejection flow path member such as a support member 1200. Examples of the liquid ejection flow path member include an ink jet flow path member.

The molding material according to the present invention may be prepared at a temperature of, for example, from 15° C. to 35° C. by kneading the filler and the like with the liquid epoxy resin composition. Since the kneading may be conducted in such an ordinary temperature atmosphere, an epoxy resin composition with high reactivity, which has heretofore not been used, can be used.

Since the molding material according to the present invention is clayish at ordinary temperature, any amount thereof may be simply weighed out. In addition, since a molding material is pelletized in usual transfer molding, it is required to be preheated by, for example, microwave. However, the molding material according to the present invention can be molded without conducting the preheating. Further, since the molding material according to the present invention is low in melt viscosity and high in flowability upon molding, it can be used for molding of a complicated, precise and large part.

In the present invention, the liquid epoxy resin composition and the wetting dispersant are used, whereby the surface of the filler can be covered with the epoxy resin without developing a pinhole, so that no dissolution of the filler component is observed.

When, for example, a powdery curing agent is melted by heating and caused to react with the molding material according to the present invention, a portion where the amount of the curing agent is large and a portion where the amount is small are caused when locally viewed. However, since the epoxy resin composition is liquid and uniformly dissolved, reaction can be completed. Therefore, the molding material according to the present invention is excellent in chemical resistance, and its dissolution in a liquid such as an ink is scarcely observed.

Since the molding material according to the present invention has excellent properties as described above, it can be used in a part for which elution of a material from the part needs to be avoided. The molding material according to the present invention is suitably used in not only the liquid ejection flow path member, but also a member of, for example, a water purifier or medical equipment.

EXAMPLES

Molding materials were evaluated as to the following items.

Moldability

Transfer molding was conducted by means of MF-0 (trade name, manufactured by MARUSHICHI ENGINEERING CO., LTD.) under the following conditions to mold a molding material into a strip specimen (70×10×3 mm (thickness)), thereby confirming the moldability of the molding material. Incidentally, a mold is an assembling type, and so a molded article is taken out by separating and disassembling the mold.

Injection pressure: 50 kgf/cm²;
Injection speed: 5 cm/s;
Cure time: 5 minutes; and
Six parts per one shot.

A cured product obtained by further heat-curing the molded article obtained by the above method for 1.5 hours at 180° C. was used to evaluate it as to ink absorption rate, coefficient of linear expansion, glass transition temperature, elastic modulus and tensile strength whose evaluation methods will be shown below.

Ink Absorption Rate

The cured product was immersed for 1 hour in a transparent ink for distribution (product of Canon Inc.) to measure the mass change before and after the immersion. The change rate of the mass was regarded as an ink absorption rate.

Glass Transition Temperature (Tg) and Coefficient of Linear Expansion

TMA SS6100 (trade name, manufactured by SII Nano Technology Inc.) was used to measure a transition point of linear expansion, and thus the temperature at this point was regarded as the class transition temperature (Tg) to determine a1 (coefficient of linear expansion at the glass transition temperature or lower).

Elastic Modulus

DMS (viscoelasticity measuring device; trade name: DMS 6100, manufactured by SII Nano Technology Inc.) was used to measure the elastic modulus under conditions of 25° C. and 10 KHz.

Tensile Strength

Tensile strength was determined by a 5582 type universal material testing machine (manufactured by Instron Co.) in accordance with ASTM D638.

Example 1

A molding material of the formulation shown in Table 1 was prepared. Specifically, after a liquid epoxy resin composition, a thixotropy-imparting agent and a wetting dispersant were mixed, the resultant mixture was stirred while gradually adding a filler into the mixture. The mixing of the respective materials was conducted by using a planetary mixer while controlling the temperature to 25° C. Thereafter, the mixture was kneaded by a triple roll mill so as not to leave aggregates of the filler, thereby obtaining the molding material. The molding material was subjected to the above-described evaluations. The results are shown in Table 1.

Examples 2 to 9, and Comparative Examples 1 to 10

Molding materials were prepared in the same manner as Example 1 except that the formulation of the molding material was changed to the formulations shown in Tables 1 and 2 to make the evaluations. Results are shown in Tables 1 and 2.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Liquid epoxy resin composition (part by mass) | Epoxy resin | jER Cure 828EL | 95 | 95 | 95 | 95 | 95 | 95 | 95 | — | — |
| | | HP-7200L | — | — | — | — | — | — | — | 95 | 95 |
| | Curing agent | jER Cure YH-307 | 110 | 110 | — | — | — | — | — | 100 | 100 |
| | | jER Cure EMI24 | 0.5 | 0.5 | 4 | 4 | 4 | 4 | 4 | 0.5 | 0.5 |
| | Silane coupling agent | A-187 | — | — | 5 | 5 | 5 | 5 | 5 | 5 | 5 |
| | | A-186 | 5 | 5 | — | — | — | — | — | — | — |
| Thixotropy-imparting agent (part by mass) | | BYK-410 | 0.5 | 0.5 | — | 0.5 | — | 0.5 | 0.5 | 1 | 1 |
| | | BYK-411 | — | — | 0.5 | — | — | — | — | — | — |
| | | Aerosil 200 | — | — | — | — | 2 | — | — | — | — |
| Wetting dispersant (part by mass) | | DISPERBYK-145 | 0.5 | 0.5 | 0.5 | 0.5 | 0.5 | 0.5 | 0.5 | 1 | 1 |
| Filler (part by mass) | | FB-950 | 1700 | 200 | 800 | 800 | 800 | — | 320 | 1600 | — |
| | | FB-5D | 100 | 1000 | 100 | 100 | 100 | — | 20 | 200 | — |
| | | DMA-20 | — | — | — | — | — | 900 | 730 | — | 1800 |
| | | DMA-05A | — | — | — | — | — | 100 | 80 | — | 200 |
| Formulation of molding material (% by mass) | Liquid epoxy resin composition | | 10.46 | 14.90 | 10.35 | 10.35 | 10.33 | 9.40 | 8.29 | 10.01 | 9.10 |
| | Thixotropy-imparting agent | | 0.02 | 0.04 | 0.05 | 0.05 | 0.20 | 0.05 | 0.04 | 0.05 | 0.05 |
| | Wetting dispersant | | 0.02 | 0.04 | 0.05 | 0.05 | 0.05 | 0.05 | 0.04 | 0.05 | 0.05 |
| | Filler | | 89.50 | 85.02 | 89.55 | 89.55 | 89.42 | 90.50 | 91.63 | 89.89 | 90.80 |
| Formulation of molding material (% by volume) | Liquid epoxy resin composition | | 20.44 | 27.81 | 20.23 | 20.23 | 20.17 | 28.78 | 18.94 | 19.64 | 28.03 |
| | Thixotropy-imparting agent | | 0.05 | 0.07 | 0.10 | 0.10 | 0.10 | 0.14 | 0.09 | 0.10 | 0.14 |
| | Wetting dispersant | | 0.05 | 0.07 | 0.10 | 0.10 | 0.10 | 0.14 | 0.09 | 0.10 | 0.14 |
| | Filler | | 79.46 | 72.06 | 79.58 | 79.58 | 79.34 | 70.95 | 80.88 | 80.16 | 71.69 |
| State | | | Clayish | Clayish | Clayish | Clayish | Clayish | Clayish | Clayish | Clayish | Clayish |
| Ink absorption rate (%) | | | 0.30 | 0.50 | 0.31 | 0.31 | 0.31 | 0.25 | 0.28 | 0.21 | 0.18 |
| Coefficient of linear expansion (ppm/° C.) | | | 7.2 | 10 | 6.5 | 6.5 | 6.5 | 18 | 9.8 | 6.0 | 18 |
| Tg (° C.) | | | 80 | 80 | 138 | 138 | 138 | 140 | 139 | 115 | 114 |
| Elastic modulus (GPa) | | | 16 | 14 | 15 | 15 | 15 | 19 | 18 | 19 | 18 |
| Tensile strength (MPa) | | | 70 | 70 | 68 | 68 | 68 | 50 | 55 | 70 | 50 |
| Moldability | | | Good | Good | Good | Good | Good | Good | Good | Good | Good |

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Epoxy resin composition (part by mass) | Epoxy resin | jER Cure 828EL | 95 | 95 | 95 | 95 | 95 | 95 | 95 | 95 | 95 | — |
| | | HP-7200L | — | — | — | — | — | — | — | — | — | 95 |
| | Curing agent | jER Cure YH-307 | — | — | — | — | — | — | — | — | — | — |
| | | jER Cure EMI24 | 4 | 4 | 4 | 4 | 4 | 4 | 4 | 4 | 4 | 4 |
| | Silane coupling agent | A-187 | 5 | 5 | 5 | 5 | 5 | 5 | 5 | 5 | 5 | 5 |
| | | A-186 | — | — | — | — | — | — | — | — | — | — |
| | State | | Liquid | Liquid | Liquid | Liquid | Liquid | Liquid | Liquid | Liquid | Liquid | Solid |
| Thixotropy-imparting agent (part by mass) | | BYK-410 | — | — | 0.5 | — | — | — | — | 2 | 5 | — |
| | | BYK-411 | — | — | — | — | — | — | — | — | — | 0.5 |
| | | Aerosil 200 | — | — | — | — | — | 2 | 5 | — | — | — |
| Wetting dispersant (part by mass) | | DISPERBYK-145 | — | 0.5 | — | 2 | 5 | — | — | — | — | 0.5 |
| Filler (part by mass) | | FB-950 | 800 | 800 | 800 | 800 | 800 | 800 | 800 | 800 | 800 | 800 |
| | | FB-5D | 100 | 100 | 100 | 100 | 100 | 100 | 100 | 100 | 100 | 100 |
| | | DMA-20 | — | — | — | — | — | — | — | — | — | — |
| | | DMA-05A | — | — | — | — | — | — | — | — | — | — |
| Formulation of molding material (% by mass) | Epoxy resin composition | | 10.36 | 10.35 | 10.35 | 10.34 | 10.30 | 10.34 | 10.30 | 10.34 | 10.30 | 10.35 |
| | Thixotropy-imparting agent | | 0 | 0 | 0.05 | 0 | 0 | 0.20 | 0.50 | 0.20 | 0.50 | 0.05 |
| | Wetting dispersant | | 0 | 0.05 | 0 | 0.20 | 0.50 | 0 | 0 | 0 | 0 | 0.05 |
| | Filler | | 89.64 | 89.60 | 89.60 | 89.46 | 89.20 | 89.46 | 89.20 | 89.46 | 89.20 | 89.55 |
| Formulation of molding material (% by volume) | Epoxy resin composition | | 20.27 | 20.24 | 20.24 | 20.19 | 20.06 | 20.19 | 20.06 | 20.19 | 20.06 | 20.23 |
| | Thixotropy-imparting agent | | 0 | 0 | 0.10 | 0 | 0 | 0.39 | 0.97 | 0.39 | 0.97 | 0.10 |
| | Wetting dispersant | | 0 | 0.10 | 0 | 0.39 | 0.97 | 0 | 0 | 0 | 0 | 0.10 |
| | Filler | | 79.73 | 79.66 | 79.66 | 79.42 | 78.97 | 79.42 | 78.97 | 79.42 | 78.97 | 79.57 |
| State | | | Granular | Clayish | Granular | Clayish | Clayish | Granular | Powdery | Granular | Granular | Powdery |
| Ink absorption rate (%) | | | | | | | | Not measured | | | | |
| Coefficient of linear expansion (ppm/° C.) | | | | | | | | | | | | |
| Tg (° C.) | | | | | | | | | | | | |
| Elastic modulus (GPa) | | | | | | | | | | | | |
| Tensile strength (MPa) | | | | | | | | | | | | |
| Moldability | | | *1 | *2 | *1 | *2 | *3 | *1 | *4 | *1 | *5 | *1 | iER Cure 828EL: Trade name, bisphenol type epoxy resin (liquid), produce of Mitsubishi Chemical Corporation;
HP-7200L: Trae name, dicyclopentadiene type epoxy resin (solid), product of DIC Corporation;
iER Cure YH-307L: Trade name, trialkyltetrahydrophthalic anhydride (liquid), produce of Mitsubishi Chemical Corporation;
iER Cure EM124: Trade name, 2-ethyl-4-methylimidazole (liquid), produce of Mitsubishi Chemical Corporation;
A-187: Trade name, γ-glycidoxypropyltrimethoxysilane, product of Momentive Performance Material Inc.;
A-186: Trade name, β-(3,4-epoxycyclohexyl)ethyltrimethoxysilane, product of Momentive Performance Material Inc.;
BYK-410: Trade name, urea-urethane, product of BYK-Chemie GmbH;
BYK-411: Trade name, urea-urethane, product of BYK-Chemie GmbH;
Aerosil 200: Trade name, product of NIPPON AEROSIL CO., LTD.;
DISPERBYK-145: Trade name, phosphate salt, product of BYK-Chemie GmbH;
FB-950: Trade name, spherical fused silica having an average particle size of 24 atm, product of DENKI KAGAKU KOGYO KABUSHIKI KAISHA;
FB-5D: Trade name, spherical fused silica having average particle size of 5 μm, product of DENKI KAGAKU KOGYO KABUSHIKI KAISHA;
DMA-20: trade name, spherical alumina having an average particle size of 20 μm, product of DENKI KAGAKU KOGYO KABUSHIKI KAISHA;
DMA-05A: trade name, spherical alumina having an average particle size of 20 μm, product of DENKI KAGAKU KOGYO KABUSHIKI KAISHA.

1: Short shot and numerous voids;
2: Separation between the resin and the filler;
3: Separation among the resin, the wetting dispersant and the filler;
4: Short shot (almost no flow) and numerous voids;
5: Short shot, bubbly, and bleeding of the thixotropy-imparting agent.

In Examples 1 to 9, the molding materials with excellent moldability and physical properties were obtained. In Examples 1 and 2, the coefficient of linear expansion was adjusted by changing the mixing ratio between the fillers different in particle size. When the particle size of a filler is small, its specific surface area becomes large, and so its filling amount becomes small. In Example 2, the proportion of a filler having a small particle size is increased, thereby preparing a clayish molding material which can be easily used. In Examples 3 to 5, the amount of the thixotropy-imparting agent was changed. However, all the resultants molding materials exhibited good moldability. In Example 6, alumina was used as the filler. In Example 7, a part of the filler in Example 6 was changed to fused silica. As described above, plural kinds of fillers may also be used in combination. In Examples 8 and 9, the solid epoxy resin was used. However, a liquid epoxy resin composition was obtained after the curing agent and the silane coupling agent were mixed. Accordingly, the kneading of the filler could be successfully conducted.

On the other hand, in Comparative Examples 1 to 10, molding could not successfully conducted as shown in Table 2, and so the evaluations of the respective physical properties could not made. The molding material of Comparative Example 1 contains neither the thixotropy-imparting agent nor the wetting dispersant. Since the wetting dispersant is not contained in Comparative Example 1, the filler could not be uniformly wetted with the liquid epoxy resin composition, and so the resultant molding material becomes granular. When it was attempted to disperse the filler by lowering the viscosity of the molding material by heating it, the reaction proceeded to lower the moldability of the molding material upon molding. On the other hand, when the molding was conducted in the granular state, the mold could not be successfully filled with the molding material because the flowability of the molding material was low. In addition, the portion filled with the molding material contains a lot of voids, so that bleeding and separation of the resin component was observed. The molding materials of Comparative Examples 2, 4 and 5 contain no thixotropy-imparting agent. These molding materials became clayish after the stirring, and so molding itself could be conducted. However, the flowability of the resin component was high, and surface roughness, which is considered to be attributable to separation of the filler, was observed in the molded articles. In addition, in Comparative Example 5, the mixed amount of the wetting dispersant was large, and so a part of the wetting dispersant was separated without acting on the filler.

The molding materials of Comparative Examples 3, 6, 7, 8 and 9 contain no wetting dispersant. In these Comparative Examples, the resultant molding materials became granular like Comparative Example 1. When the thixotropy-imparting agent was solid, the molding material became powdery in Comparative Example 7 in which the amount of the thixotropy-imparting agent added was large. When the thixotropy-imparting agent was liquid, a part of the thixotropy-imparting agent was separated without acting on the filler in Comparative Example 9 in which the amount of the thixotropy-imparting agent added was large. In Comparative Example 10, the resultant molding material became powdery because the epoxy resin composition was solid, and the filler could not be completely coated with the resin component upon molding.

Incidentally, with respect to the molding material of Example 4, spiral flow was measured according to the testing method of molding materials for sealing semiconductors in JAPAN ELECTRICAL INSULATING and ADVANCED PERFORMANCE MATERIALS INDUSTRIAL ASSOCIATION (JEIA) Standards. The spiral flow was 81 cm (pressure: 6.9 MP) at 170° C. and 79 cm (pressure: 6.9 MP) at 130° C., so that the flowability of the molding material was high even at a relatively low temperature. In addition, the molding material according to this Example does not contain wax or an organic metal salt as a pelletizing agent, a flowability improver or an internal mold release agent. However, these components may also be contained as needed to such an extent that they do not elute out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-088978, filed Apr. 23, 2014 which is hereby incorporated by reference herein in its entirety.

What is claimed is:

1. A liquid ejection head including a liquid ejection flow path member, the liquid ejection flow path member comprising a cured product of a molding material comprising a liquid epoxy resin composition containing an epoxy resin, a curing agent or a curing catalyst, a filler, a thixotropy-imparting agent, and a wetting dispersant,
wherein a content of the filler in the molding material is at least 70% by volume, and
wherein a content of the liquid epoxy resin in the molding material is from 1% by volume to 30% by volume.

2. The liquid ejection head according to claim 1, wherein the thixotropy-imparting agent is urea-urethane.

3. The liquid ejection head according to claim 1, wherein the wetting dispersant is a phosphate ester salt.

4. The liquid ejection head according to claim 1, wherein the liquid epoxy resin composition contains trialkyltetrahydrophthalic anhydride as the curing agent.

5. The liquid ejection head according to claim 1, wherein the liquid epoxy resin composition contains a liquid imidazole as the curing agent.

6. The liquid ejection head according to claim 1, wherein the epoxy resin has a dicyclopentadiene skeleton.

7. The liquid ejection head according to claim 1, wherein the liquid epoxy resin composition contains a silane coupling agent.

8. The liquid ejection head according to claim 1, further comprising a recording element substrate having an ejection orifice and a support member for supporting the recording element substrate,
wherein the liquid ejection flow path member comprises the support member, and
wherein the support member comprises the cured product.

9. The liquid ejection head according to claim 1, wherein the content of the filler is at least 79% by volume.

10. A liquid ejection head including a liquid ejection flow path member, the liquid ejection flow path member comprising a cured product of a molding material comprising a liquid epoxy resin composition containing an epoxy resin, a curing agent or a curing catalyst, a filler, a thixotropy-imparting agent, and a wetting dispersant,
wherein a content of the filler in the molding material is at least 70% by volume, and
wherein a content of the liquid epoxy resin in the molding material is from 0.01% by volume to 0.5% by volume.

11. The liquid ejection head according to claim 10, wherein the thixotropy-imparting agent is urea-urethane.

12. The liquid ejection head according to claim 10, wherein the wetting dispersant is a phosphate ester salt.

13. The liquid ejection head according to claim 10, wherein the liquid epoxy resin composition contains trialkyltetrahydrophthalic anhydride as the curing agent.

14. The liquid ejection head according to claim 10, wherein the liquid epoxy resin composition contains a liquid imidazole as the curing agent.

15. The liquid ejection head according to claim 10, wherein the epoxy resin has a dicyclopentadiene skeleton.

16. The liquid ejection head according to claim 10, wherein the liquid epoxy resin composition contains a silane coupling agent.

17. The liquid ejection head according to claim 10, further comprising a recording element substrate having an ejection orifice and a support member for supporting the recording element substrate,
wherein the liquid ejection flow path member comprises the support member, and
wherein the support member comprises the cured product.

18. The liquid ejection head according to claim 10, wherein the content of the filler is at least 79% by volume.

* * * * *